United States Patent [19]

Dannels et al.

[11] 4,010,144

[45] Mar. 1, 1977

[54] FLAME RETARDANT PHOSPHATE ESTER DERIVATIVES OF ORTHO NOVOLAKS

[75] Inventors: Bobby F. Dannels; Alvin F. Shepard, both of Grand Island, N.Y.

[73] Assignee: Hooker Chemicals & Plastics Corporation, Niagara Falls, N.Y.

[22] Filed: Dec. 3, 1975

[21] Appl. No.: 637,338

Related U.S. Application Data

[63] Continuation-in-part of Ser. No. 451,670, March 13, 1974, abandoned.

[52] U.S. Cl. .......................... 260/59 R; 260/2.5 F; 260/29.3; 260/32.8 R; 428/153; 260/DIG. 24
[51] Int. Cl.² ...................................... C08G 12/44
[58] Field of Search ................................ 260/59 R

[56] References Cited

UNITED STATES PATENTS

| | | | |
|---|---|---|---|
| 2,736,706 | 2/1956 | Morris | 252/400 X |
| 3,354,240 | 11/1967 | Pochowicz | 260/924 |
| 3,409,571 | 11/1968 | Shepard et al. | 260/59 X |

OTHER PUBLICATIONS

Chem. Abstracts, vol. 56, 1962, 11785a, Bebikh et al.
Chem. Abstracts, vol. 66, 1967, 105300t, Dannels et al.
Chem. Abstracts, vol. 77, 1972, 166980j, Morris et al.

*Primary Examiner*—Howard E. Schain
*Attorney, Agent, or Firm*—Peter F. Casella; Howard M. Ellis

[57] ABSTRACT

The present invention relates to polymer compositions and to a process of producing phenolic novolak resins having a high phosphorus content. It is known that phenolic novolak resins may be reacted with $P_2O_5$. However, it has now been found that if the novolak has substantially entirely ortho-ortho linkage the amount of phosphorus, suitably in the form of $P_2O_5$, $P_2S_5$, $P_2O_3$ or mixtures thereof, that may be reacted is greatly increased and the polymer produced has enhanced fire-retardant properties. The present polymers have a wide utility in the production of flame-retardant molding compositions and laminates.

11 Claims, No Drawings

FLAME RETARDANT PHOSPHATE ESTER DERIVATIVES OF ORTHO NOVOLAKS

This is a continuation-in-part of copending application Ser. No. 451,670, filed Mar. 13, 1974 and entitled Flame Retardant Phosphate Ester Derivatives, and now abandoned.

The present invention relates to flame-retardant polymers, to additives useful for the production of flame-retardant polymers, to processes for producing such polymers and additives, and to articles made using such polymers and additives. More particularly the present invention relates to a phenolic novolak resin containing a high percent by weight of phosphorus. The phenolic novolak resins contain a higher percent by weight of phosphorus then hitherto it was thought possible.

It has long been known that $P_2O_5$ reacts with phenol to form a mixture of primary and secondary phenyl phosphates. This reaction is described in Beilstein Handbuch der Organischem Chemie, Vol VI, p. 120 and in "Organophosphorus Compounds", G. N. Kosolapoff, p. 220. $P_2O_5$ may be reacted with phenols by merely stirring it into melted phenol at slightly elevated temperatures. However, novolak resins are polyfunctional and because of the high degree of functionality, tend to cross-link and gel when reacted with other polyfunctional substances. $P_2O_5$ in its reactions with ordinary novolaks behaves as a polyfunctional reactant. Small amounts of $P_2O_5$, generally only up to about ten percent of theory, can be reacted with a typical novolak resin. When attempts are made to react larger amounts of $P_2O_5$, intractable cross-linked gelled products result. It is contemplated that a reaction occurs in which secondary phosphate radicals link together novolak molecules to form highly complex products. Thus, in reacting novolak resins and $P_2O_5$ intermolecular reactions result causing rapid increase in viscosity and subsequent gelation. In any case the amount of $P_2O_5$ that can be reacted with a normal novolak resin and still maintain a reasonable viscosity is about ten percent by weight.

It has now been discovered that high proportions of phosphorus, from about 8 to about 20% by weight may be reacted with novolak resins. In terms of $P_2O_5$, amounts between about 20 and about 45% by weight may be reacted with novolak resins. The starting novolak resin that is required contains largely o,o'-rather than o,p'-linkages between the phenol nuclei. A method of making such o,o'-linked novolak resins is set forth in U.S. Pat. No. 3,425,989 issued Feb. 4, 1969.

It is postulated that the unexpected result is realized as a result of the following chemical reaction taking place between o,o'-linked novolak resin and the phosphorus compound to be added, the reaction appears to be intramolecular for example with $P_2O_5$:

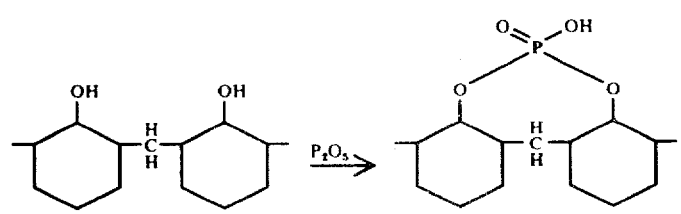

Thus the following moieties would both be present in novolak resins of the present invention when the reaction is with $P_2O_5$ or $P_2S_5$:

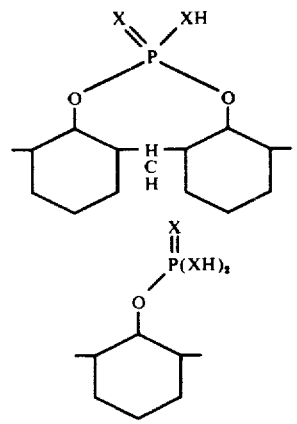

wherein X is selected from the group of O or S. In the thus reacted novolaks at least 9% of the alkylidene linkage is ortho to ortho and at least 25% of the phenolic hydroxyl groups are esterified.

Generally, when mixtures of $P_2O_5$, $P_2S_5$ and $P_2O_3$ are used, the moieties present on the reacted novolaks can be represented as follows:

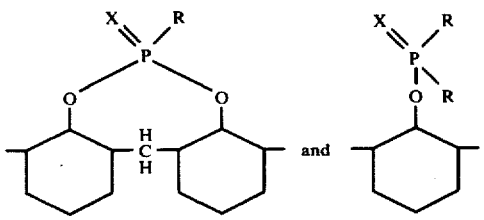

wherein X is as described above and each R is independently selected from the group of XH and H. In the thus reacted novolaks, at least 90% of the alkylidene linkage is ortho to ortho, and at least 25% of the phenolic hydroxyl groups are esterified.

One possible example of the structure of a novolak resin of the present invention is:

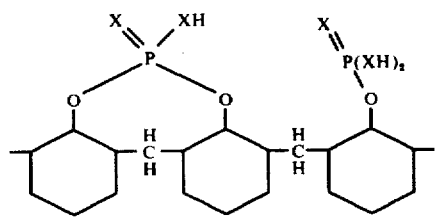

Another example of the structure of a novolak resin of the present invention is:

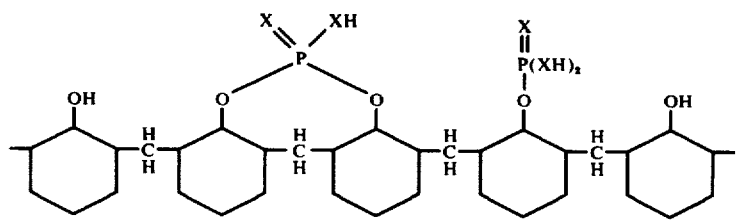

When $P_2O_3$ is utilized, the following moieties would be present in the novolak resins of the present invention:

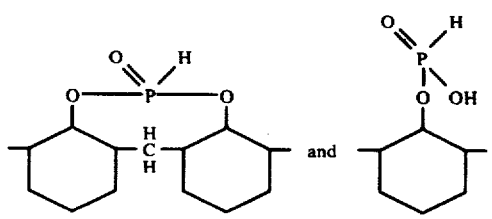

Thus, some possible exemplary structures of the reaction product of $P_2O_3$ and the novolak resins having largely o,o'-linkages are:

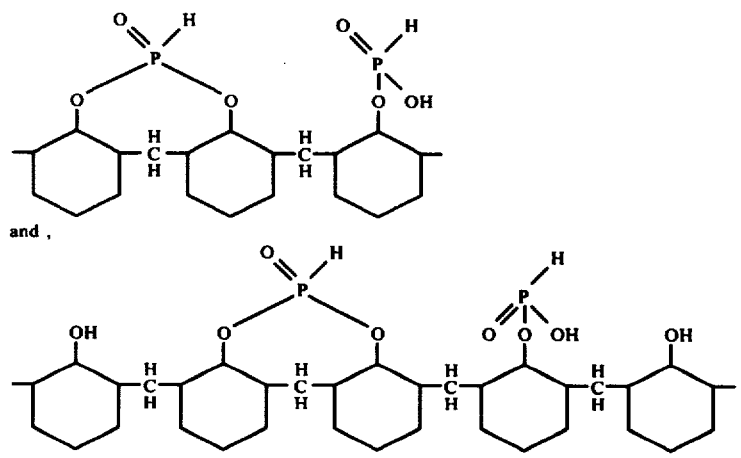

The novolak resin phosphate esters of the present invention are useful in the fabrication of flame retardant paper, paper products, laminates, fibrous insulation, foams, molded articles and in addition are suited to use in areas generally in which phenolic novolak resins are utilized.

The novolak phosphates of the present invention are also useful in the same manner as ordinary novolaks to produce molded objects and laminates. This may be done by selecting a novolak phosphate in which about 25 to about 75% of the phenolic hydroxyls have been esterified and reacting it with a source of aldehyde such as aqueous formaldehyde, paraformaldehyde or hexamethylenetetramine as is commonly done with ordinary phenolic resins. Thus a mixture of powdered novolak and hexamethylenetetramine may be rolled with asbestos fiber on hot differential rolls and hot molded to produce molded items of low flammability. the novolak phosphates of the present invention are also valuable in the preparation of polyurethane foams of low flammability. Thus a novolak phosphate of high phosphorus content may be reacted with ethylen oxide to produce polyhydroxyethyl esters and the resulting polyhydroxy compound further reacted with polyisocyanates, blowing agents, etc., as desired to produce a highly flame retardant foam.

In accord with the present invention a phosphorus containing compound, such as $P_2O_5$, $P_2S_5$, $P_2O_3$ or mixtures thereof, is admixed at slightly elevated temperatures with a novolak resin containing largely o,o'-linkage. The percentage of o,o'-linkage is preferably greater than 90%. The useful reaction temperature range is from about 20° to about 280° C. Although the reaction occurs at ambient temperature the reaction time is extenuated. Preferably a reaction temperature in the range of from about 80 to 250° is utilized.

The following examples illustrate the process and products of the invention but are not intended to limit the scope thereof. In these examples temperatures are given in degrees centigrade and parts by weight unless indicated otherwise.

EXAMPLE 1

312 parts of a novolak resin containing about 90% o,o'-linkage and having a molecular weight of 350 was heated to 130°. 140 parts of $P_2O_5$ was then added in small increments. As the viscosity of the reaction mixture increased, the temperature was raised so that the mixture remained fluid. The last portion of $P_2O_5$ was added at a temperature of 220°. The reaction mixture became so viscous that it was not practical to add additional $P_2O_5$. The mixture was allowed to cool and the resulting product was a dark colored brittle resin. The product was essentially completely soluble in warm 10% NaOH indicating the absence of a high degree of crosslinking.

EXAMPLE 2

In a similar manner 312 parts of a randomly linked novolak with a molecular weight of 500 was reacted with $P_2O_5$. After 75 parts had been added, the mixture became so viscous that further addition was impossible. The product was not soluble in hot 10% NaOH nor in common organic solvents, indicating a crosslinked gel.

EXAMPLE 3

The free phenol content of the ortho novolak resin used in Example 1 was reduced to less than 0.5% by distilling phenol off under reduced pressure. 595 parts of the resulting novolak, which now had a molecular weight of 550, was heated to 180° and $P_2O_5$ slowly added. After the addition of 130 parts, the reaction mixture became too viscous to continue. This product dissolved in warm 10% NaOH. At the point where 110 parts of $P_2O_5$ had been reacted, the reaction mixture was sufficiently fluid to be easily stirred and aptly suited for molding applications.

EXAMPLE 4

590 parts of dephenolated novolak used in Example 3 was dissolved in 830 parts of chlorobenzene. The mixture was heated to 90° and 261 parts of $P_2O_5$ were added over a 1 hour period. The reaction temperature was then increased to 132° and held for an additional 6 hours. It was noted that a trace amount of sticky solid adhered to the walls of the reactor. The solution was decanted into 6000 parts of hexane. A light pink solid precipitated in the form of a fine powder.

EXAMPLE 5

400 parts of an ortho novolak resin having a molecular weight of approximately 380 with less than 1% free phenol was placed in a stirred reactor. The resin was heated to 170° and 71 parts of $P_2O_5$ were added in small increments over a 3 hour period. Heating in the range of 170°–175° was continued over a 10 hour period. The viscosity was still in an acceptable range. The resin was then poured into a pan and allowed to harden. The product was a redish brown resin.

EXAMPLE 6

Solutions of the product of Example 5 were prepared with the following compositions:

| | A |
|---|---|
| 10 parts | product of Example 5 |
| 10 parts | methyl ethyl ketone |
| 10 parts | 10% solution of hexamethylenetetramine in 80% isopropyl alcohol 20% $H_2O$ |
| | B |
| 10 parts | product of Example 5 |
| 10 parts | isopropyl alcohol |
| 2 parts | $NH_3OH$ |
| 12 parts | $H_2O$ |
| 1 part | hexamethylenetetramine |

Separately, the solutions were then tested by applying the solution to one side of a heavy kraft paper with an add-on such that 18 to 30% total solids were added. After drying the sheets were cured at 180° under pressure for 30 minutes. The sheet were then glued to one side of a ¾" thick fir plywood panel. In a radiant panel test the samples rated noncombustible.

EXAMPLE 7

In the manner of Example 4, 100 parts of an ortho novolak resin having a molecular weight of 380 and having less than 1% free phenol was reacted with 35.5 parts of $P_2O_5$ using 89 parts of chlorobenzene as solvent. Twenty parts of the product thus obtained was slowly added to a pressure reactor containing 37 parts of ethylene oxide. The mixture was allowed to react for 20 hours at 25°. The reactor was then opened and the unreacted ethylene oxide allowed to distill off. The product was a light colored liquid and amounted to 34 parts.

EXAMPLE 8

A solution of 132 parts of the product of Example 7 in 35 parts of methylene chloride was prepared. One part of n-methylmorpholine and one part of X521 silicone, a product of Union Carbide was added to the solution. The resulting mixture was rapidly mixed with 53 parts of toluene diisocyanate. A rigid foam results. The foam was exposed to direct flame and found to be self-extinguishing when the flame was removed.

In a like manner $P_2O_5$ and $P_2O_3$ may be substituted for $P_2O_5$ in the foregoing examples with similar result.

While the present invention has been described with reference to certain specific embodiments, it will be recognized by those skilled in the art that many variations are possible without departing from the spirit and scope of the invention.

What is claimed is:

1. A novolak resin wherein at least 90% of the alkylidene linkage is ortho to ortho and at least 25% of the phenolic hydroxyl groups are esterified and which comprises the following moieties:

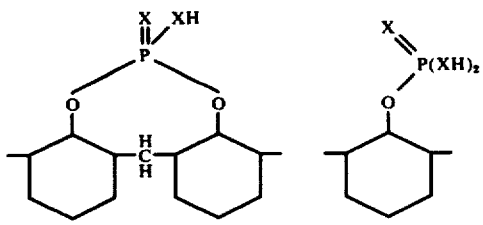

wherein X is selected from the group consisting of O or S.

2. The novolak resin of claim 1 having the structure:

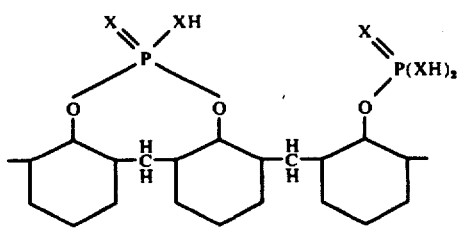

3. The novolak resin of claim 1 having the structure:

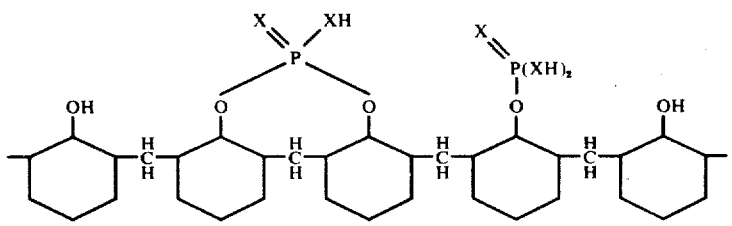

4. The compound of claim 1 wherein the novolak resin contains from about 8.7 to about 19.6% phosphorus by weight.

5. The method of producing a flame-retardant polymer which comprises the step of esterifying a novolak resin containing at least 90% of the alkylidene linkage as ortho to ortho with a member selected from the group consisting of $P_2O_5$, $P_2O_5$, $P_2O_3$ or mixtures thereof to provide the novolak resins of claim 1.

6. A novolak resin wherein at least 90% of the alkylidene linkage is ortho to ortho and at least 25% of the phenolic hydroxyl groups are esterified and which comprise the following moieties:

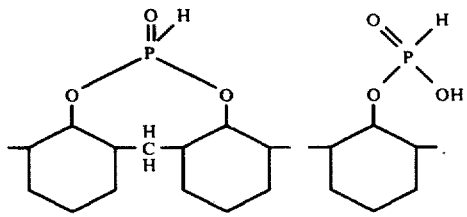

7. The compound of claim 6 wherein the novolak resin contains from about 8 to about 20% phosphorus by weight.

8. The method of producing a flame-retardant polymer which comprises the step of esterifying a novolak resin containing at least 90% of the alkylidene linkage as ortho to ortho with $P_2O_3$ to provide the novolak resins of claim 6.

9. A novolak resin where at least 90% of the alkylidene linkage is ortho to ortho and at least 25% of the phenolic hydroxyl groups are esterified and which comprises the following moieties:

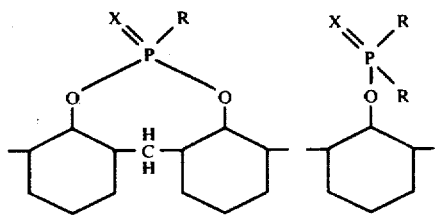

wherein X is selected from the group consisting of O or S and each R is independently selected from XH or H.

10. The novolak resin of claim 6 having the structure:

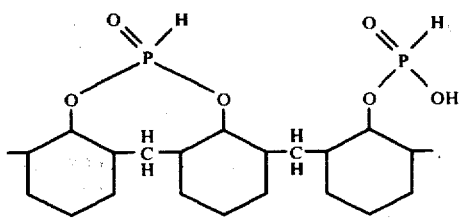

11. The novolak resin of claim 6 having the structure:

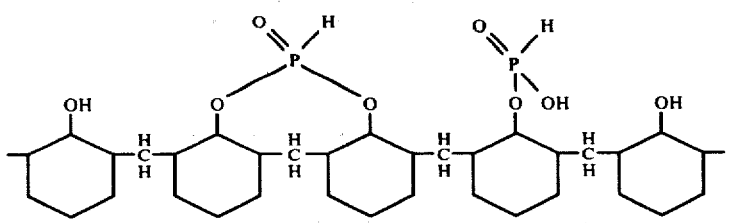

* * * * *